United States Patent
Sjunnesson

(10) Patent No.: US 8,070,432 B2
(45) Date of Patent: Dec. 6, 2011

(54) STATIC GAS TURBINE COMPONENT AND METHOD FOR REPAIRING SUCH A COMPONENT

(75) Inventor: Anders Sjunnesson, Trollhättan (SE)

(73) Assignee: Volvo Aero Corporation, Trollhattan (SE)

( * ) Notice: Subject to any disclaimer, the term of this patent is extended or adjusted under 35 U.S.C. 154(b) by 776 days.

(21) Appl. No.: 11/722,716

(22) PCT Filed: Dec. 19, 2005

(86) PCT No.: PCT/SE2005/001975
§ 371 (c)(1),
(2), (4) Date: Aug. 21, 2008

(87) PCT Pub. No.: WO2006/068599
PCT Pub. Date: Jun. 29, 2006

(65) Prior Publication Data
US 2009/0028699 A1   Jan. 29, 2009

(30) Foreign Application Priority Data
Dec. 23, 2004   (SE) ....................... 0403193

(51) Int. Cl.
*F01D 9/04* (2006.01)
(52) U.S. Cl. .................. 415/209.4; 415/210.1

(58) Field of Classification Search ............... 415/209.4, 415/210.1
See application file for complete search history.

(56) References Cited

U.S. PATENT DOCUMENTS

| 3,892,612 | A |   | 7/1975 | Carlson et al. |
| 4,108,572 | A |   | 8/1978 | Platt |
| 4,111,606 | A |   | 9/1978 | Prewo |
| 4,132,069 | A |   | 1/1979 | Adamson et al. |
| 5,056,738 | A | * | 10/1991 | Mercer et al. ............ 244/54 |
| 7,063,505 | B2 | * | 6/2006 | Czachor .................. 415/209.4 |
| 7,200,999 | B2 | * | 4/2007 | Bagnall et al. ............ 60/785 |

FOREIGN PATENT DOCUMENTS
WO   9525877 A1   9/1995

OTHER PUBLICATIONS

International Search Report for corresponding International Application PCT/SE2005/001975.

* cited by examiner

*Primary Examiner* — Trung Q Dang
(74) *Attorney, Agent, or Firm* — WRB-IP LLP

(57) ABSTRACT

A static gas turbine component includes an inner and an outer annular support member and a plurality of circumferentially spaced radial struts arranged between the support members for transmitting structural loads. Each of a plurality of the struts includes a load carrying core rigidly fixed to both the inner and the outer support member forming a unitary carcass with the support members, an impact resistant shell surrounding the core, and an energy absorbing material arranged between the core and the shell.

19 Claims, 3 Drawing Sheets

STATIC GAS TURBINE COMPONENT AND METHOD FOR REPAIRING SUCH A COMPONENT

BACKGROUND AND SUMMARY

The present invention relates to a static gas turbine component comprising an inner and an outer annular support member and a plurality of circumferentially spaced radial struts arranged between said support members for transmitting structural loads. The invention also relates to a method for repairing the static gas turbine component.

The gas turbine component may be used in stationary gas turbine engines, but is especially advantageous for aircraft jet engines. Jet engine is meant to include various types of engines, which admit air at relatively low velocity, heat it by combustion and shoot it out at a much higher velocity. Accommodated within the term jet engine are, for example, turbojet engines and turbo-fan engines. The invention will below be described for a turbo-fan engine, but may of course also be used for other engine types.

An aircraft gas turbine engine of the turbofan type generally comprises a forward fan and booster compressor, a middle core engine, and an aft low pressure power turbine. The core engine comprises a high pressure compressor, a combustor and a high pressure turbine in a serial relationship. The high pressure compressor and high pressure turbine of the core engine are interconnected by a high pressure shaft. The high-pressure compressor, turbine and shaft essentially form a high pressure rotor. The high-pressure compressor is rotatably driven to compress air entering the core engine to a relatively high pressure. This high pressure air is then mixed with fuel in the combustor and ignited to form a high energy gas stream. The gas stream flows aft and passes through the high-pressure turbine, rotatably driving it and the high pressure shaft which, in turn, rotatably drives the high pressure compressor.

The gas stream leaving the high pressure turbine is expanded through a second or low pressure turbine. The low pressure turbine rotatably drives the fan and booster compressor via a low pressure shaft, all of which form the low pressure rotor. The low pressure shaft extends through the high pressure rotor. Most of the thrust produced is generated by the fan. Engine frames are used to support and carry the bearings, which in turn, rotatably support the rotors. Conventional turbo fan engines have a fan frame, a mid-frame and an aft turbine frame.

The engine is mounted to the aircraft at a forwardly located fan frame forward mount on the fan frame and at a rearwardly located turbine frame aft mount on the turbine frame.

The structural strength of the gas turbine engine hinges upon a limited number of engine structures, also known as cases or housings. These structures therefore represent the skeleton of the engine. The structures are highly loaded during operation of the engine. The structures usually comprise a bearing house for the engine shafts, a gas flow channel in the form of an annular duct and radial struts which form the link between the inner and outer parts of the engine. Thus the air is forced rearwardly through the openings between adjacent struts. The inventive gas turbine component forms such a structure.

Aircraft engines should be as light as possible. In order to build as light engines as possible, the engine's non-rotating, load transmitting, structural parts should be as stiff and rigid as possible. One way of achieving this is to use composites due to the fact that they have a high specific stiffness and strength.

Aircraft engines must be able to work for different load cases and certain occurrences in order to operate safely. One specific problem is so-called Foreign Object Damage (FOD). One category of FOD's is when particles, birds or hail are sucked in through the engine intake and hit a strut (located either before or after the fan). If the strut is not arranged for transmitting loads during operation, deteriorated mechanical functionality may be accepted, but if the strut is arranged for transmitting loads during operation, it must either be sufficiently strong for enduring the operational loads with a deteriorated mechanical functionality or be repaired or exchanged.

Depending on the geometrical complexity and the risk for geometrically extended damages, it is difficult to make local repairs.

It is desirable to achieve a static gas turbine component comprising an inner annular support member, an outer annular support member and a plurality of circumferentially spaced radial struts arranged between said support members, with a design that creates conditions for easy repair when it has been damaged during use.

According to an aspect of the present invention, each of a plurality of said struts comprises a load carrying core rigidly fixed to both the inner and the outer support members forming a unitary carcass with the members, an impact resistant shell surrounding the core, and an energy absorbing material arranged between the core and the shell.

Thus, the carcass forms a unitary load transmitting structure. In the event of a foreign object colliding with a strut, the impact resistant shell is designed to withstand a smaller impact energy without being damaged. In the event of a larger impact energy, the shell will be severely damaged while the energy absorbing material will absorb a larger portion of the impact energy. In this way, the load transmitting core is protected even for large energy impacts. Thus, the carcass can be maintained intact during use.

The shell and the energy absorbing material are removably connected to the load transmitting carcass. Thus, when it is time for repair, the shell and the energy absorbing material are removed from the carcass, leaving the carcass homogeneous, ie in the form of one single piece. The shell is preferably removed mechanically, while the energy absorbing material may be removed mechanically or chemically.

A new impact resistant shell and a new energy absorbing material are thereafter applied to the cores of the used unitary carcass.

According to an aspect of the invention, the energy-absorbing material forms a continuous structure around the core. Thus, the energy-absorbing material completely surrounds the core in a cross section of the strut, forming a distance between the shell and the core around its complete circumference. In other words, the core is completely embedded in the energy-absorbing material.

According to an aspect of the invention, the energy absorbing material comprises a polymer composite. This creates conditions for a light, stiff and strong structure.

It is also desirable to achieve a time and/or cost efficient method for repairing the static gas turbine component.

According to an aspect of the present invention, after use of the component, the used impact resistant shell and the used energy absorbing material of each strut are removed from each core of the unitary carcass, and that a new impact resistant shell and a new energy absorbing material are applied to the cores of the used unitary carcass.

Further advantageous embodiments and further advantages of the invention emerge from the detailed description below.

BRIEF DESCRIPTION OF THE DRAWINGS

The invention will be explained below, with reference to the embodiments shown on the appended drawings, wherein.

DETAILED DESCRIPTION

Figure 1:
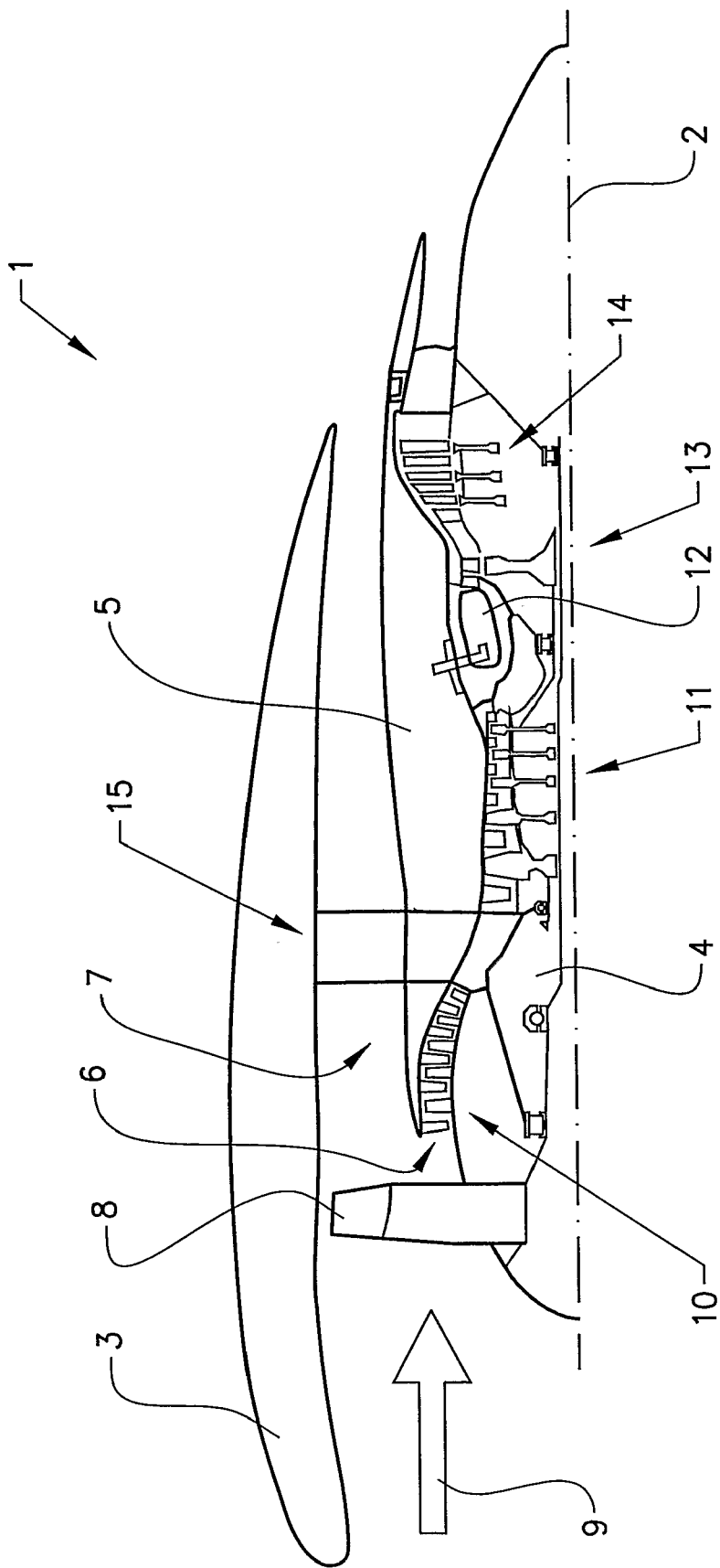
FIG. 1 illustrates an aircraft engine in a schematic cut side view.

The invention will below be described for a turbofan gas turbine aircraft engine 1, which in FIG. 1 is circumscribed about an engine longitudinal central axis 2. The engine 1 comprises an outer casing 3, or nacelle, an inner casing 4, and an intermediate casing 5, which is concentric to the first two casings and divides the gap between them into an inner primary gas channel 6 for the compression of air and a secondary channel 7 in which the engine bypass air flows. Thus, each of the gas channels 6,7 is annular in a cross section perpendicular to the engine longitudinal central axis 2.

The engine 1 comprises a fan 8 which receives ambient air 9, a booster or low pressure compressor (LPC) 10 and a high pressure compressor (HPC) 11 arranged in the primary gas channel 6, a combustor 12 which mixes fuel with the air pressurized by the high pressure compressor 11 for generating combustion gases which flow downstream through a high pressure turbine (HPT) 13 and a low pressure turbine (LPT) 14 from which the combustion gases are discharged from the engine.

A high pressure shaft joins the high pressure turbine 13 to the high pressure compressor 11 to form a high pressure rotor. A low pressure shaft joins the low pressure turbine 14 to the low pressure compressor 10 to form a low pressure rotor. The high pressure compressor 11, combustor 12 and high pressure turbine 13 are collectively referred to as a core engine. The low pressure shaft is at least in part rotatably disposed co-axially with and radially inwardly of the high pressure rotor.

A load carrying engine structure 15, in the following referred to as a static component, is arranged between the low pressure compressor 10 and the high pressure compressor 11 in the axial direction of the engine 1. The load carrying static component is also known as a case, housing, structure or frame. The component 15 is highly loaded during certain periods of a normal operating cycle of the engine.

Figure 2:
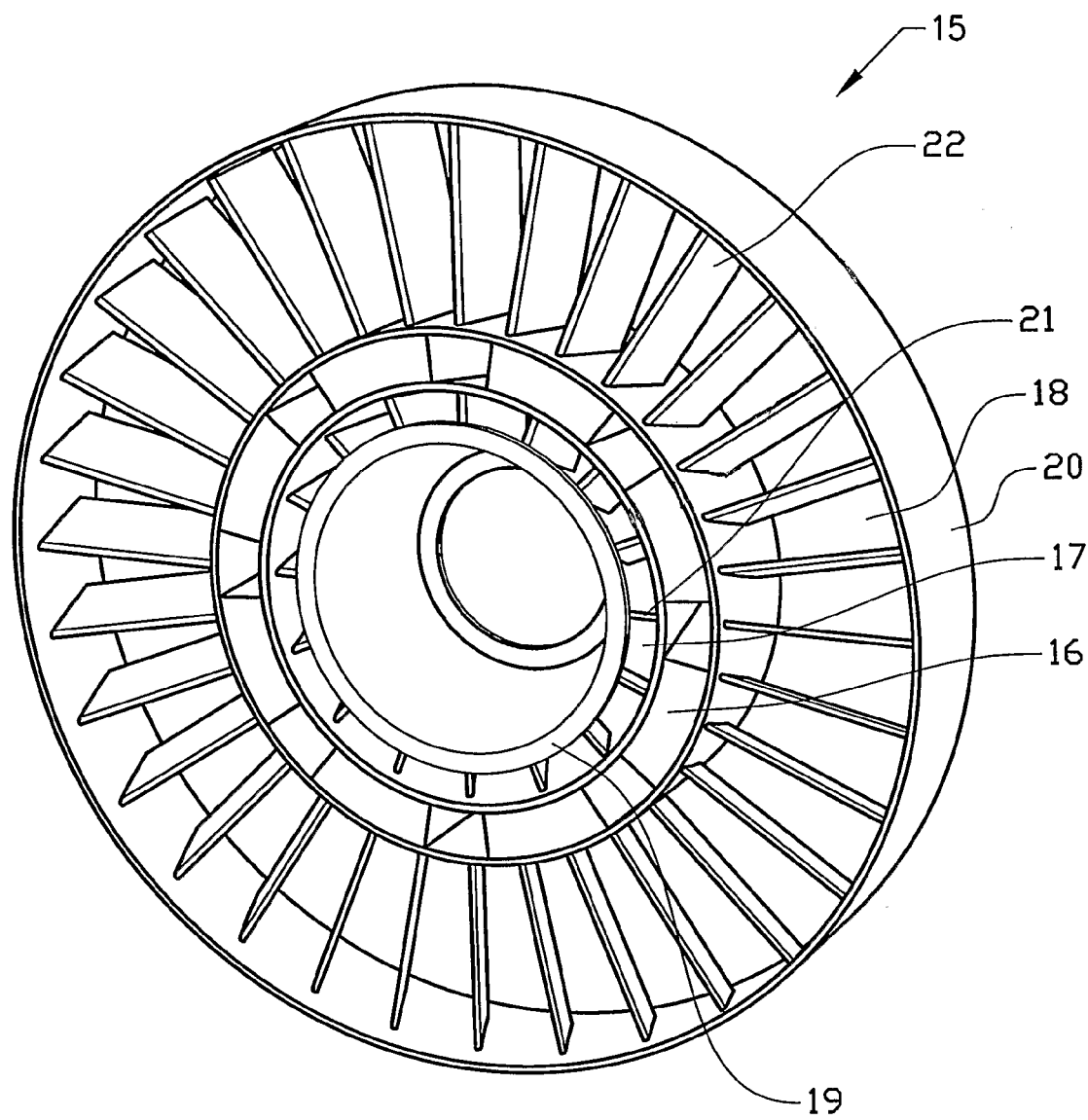
FIG. 2 illustrates a static gas turbine component in the aircraft engine in FIG. 1 in a perspective view.

FIG. 2 illustrates a perspective view of the load carrying static component 15. The static component 15 comprises an annular intermediate, or splitter, member 16, which defines inner and outer annular passages 17,18. The inner passage 17 forms part of the inner primary gas channel 6 of the aircraft engine and the outer passage 18 forms part of the secondary channel 7 in which the engine bypass air flows.

The annular intermediate member 16 is supported between an inner annular support member 19 and an outer annular support member 20 by a plurality of circumferentially spaced radial inner and outer struts 21,22, or stator vanes. The inner and outer support members 19,20 and the annular intermediate member 16 are coannular.

Opposite ends of the inner struts 21 are rigidly connected to the inner annular member 19 and the intermediate member 16 for transmitting structural loads between said members. Opposite ends of the outer struts 22 are rigidly connected to the intermediate member 16 and the outer annular member 20 for transmitting structural loads between said members.

The air is forced rearwardly through openings between adjacent struts 21,22. Each of the outer struts 22 has, along its length, an airfoil-shaped cross section, see FIG. 3, so that the air forced rearwardly through the openings between adjacent struts is axially flow-straightened in a conventional manner prior to its entry into downstream components in the engine.

Figure 3:
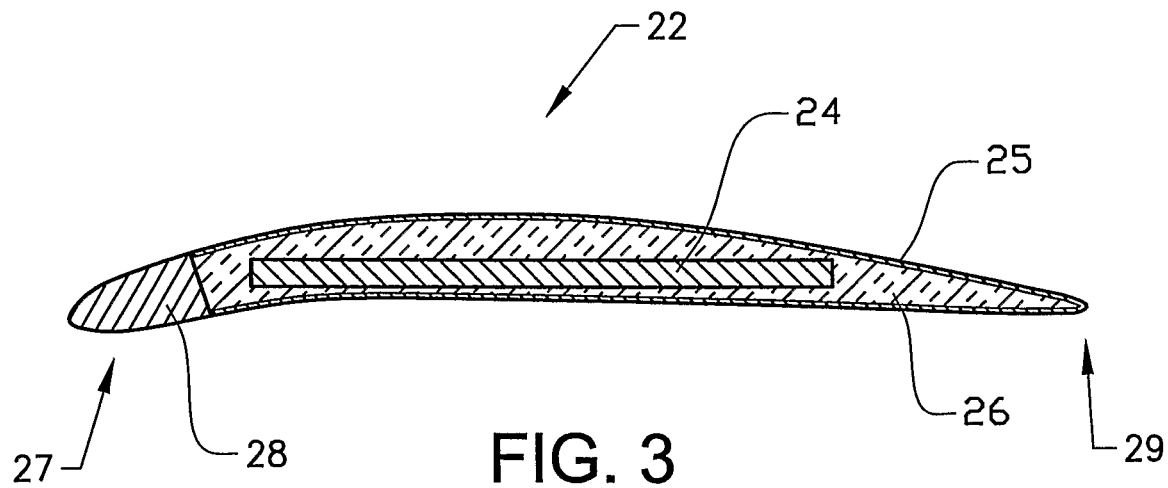
FIG. 3 illustrates a strut of the gas turbine component of FIG. 2 in cross section.

FIG. 3 illustrates one of said outer load carrying struts 22 in cross section. The strut 22 comprises a load carrying core 24, an impact resistant shell 25 surrounding the core, and an energy absorbing material 26 arranged between the core 24 and the shell 25. A leading edge 27 of the strut comprises a metallic portion 28, such as a coating, for improved impact and erosion resistance. Said portion 28 may as an alternative be of a non-metallic material.

The load carrying core 24 is formed by an elongated beam element extending in the longitudinal direction of the strut 22. The core 24 has an elongated cross section shape with a substantially longer extension in the direction from the leading edge 27 of the strut 22 to its trailing edge 29 than in a direction across the strut. The core is substantially rectangular in cross section.

The core 24 is rigidly fixed to both the outer annular support member 20 and the intermediate member 16 forming a unitary carcass with the members. In other words, the carcass is of one-piece construction. Thus, there is a mechanically rigid joint between the core 24 and the respective support member.

The energy-absorbing material 26 forms a spacing structure between the core 24 and the shell 25. More specifically, the energy-absorbing material 26 forms a continuous structure around the core 24 and is in contact with both the core 24 and the shell 25 in a radial direction of the strut 21. Said material 26 is preferably formed by a polymeric foam. The energy absorbing foam 26 should have high thermal properties and be lightweight. The lightweight material may be a cellular foam. As a specific example, the lightweight material may be a polymethacrylamide-hard foam.

Figure 4:
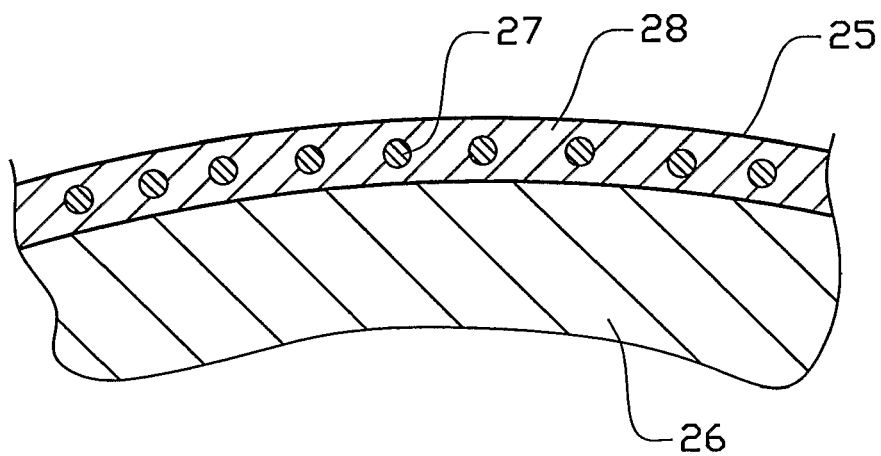
FIG. 4 illustrates a cut portion of the strut in FIG. 3.

The impact resistant shell 25 forms a continuous structure surrounding the core 24 and the energy absorbing material 26. The shell 25 comprises a polymer composite. The polymer composite shell 25 comprises a fibre structure comprising a plurality of fibres 27 embedded in a polymer matrix material 28, see FIG. 4. The fibre structure 27 runs through the matrix material 28 in the longitudinal direction of the strut 22. The matrix material is preferably formed in a curable polymer, especially a thermo set material and suitably an epoxy matrix. Said fibres 27 are preferably formed by carbon fibres, alternatively by glass fibres.

According to an alternative or complement to the embodiment described above, the inner annular circumferentially spaced struts 21 have the design shown in FIG. 3 and described above.

The invention also relates to a method for repairing the static gas turbine component 15. After use of the component 15, the used impact resistant shell 25 and the used energy absorbing material 26 of each strut 21 are removed from each core 24 of the unitary carcass, and subsequently a new impact resistant shell and a new energy absorbing material are applied to the cores of the used unitary carcass.

According to a first example of repair method, the new energy absorbing material is formed by an at least semi-stiff non-continuous circumferential structure. The structure comprises an opening for receival of the core, and the new energy-absorbing material is moved relative to the core so that the core is received in the opening. The energy-absorbing structure may have a slot at its rear end for receiving the core by forcing the sections defining the slot apart. After positioning of the new semi-stiff non-continuous energy absorbing material around the core, the shell is applied around the energy absorbing material.

According to a second example of repair method, the new shell is formed by an at least semi-stiff non-continuous circumferential structure. The core is positioned inside the semi-stiff structure and fixed in the desired position in relation to the structure. The new energy absorbing material in the form of foam is injected into the stiff structure filling up the space between the core and the stiff structure.

According to a third example of repair method, the shell may be formed by two parts. A first relatively rigid, but flexible part in the form of a non-continuous structure is positioned around the core. The first part may have a slot at its rear end for receiving the core by forcing the arms defining the slot apart. A second shell part is subsequently positioned outside the first part, forming a rigid, continuous structure. The second part may be applied in the form of a tape or a film. The new energy absorbing material in the form of foam is subsequently injected into the shell structure filling up the space between the core and the shell structure. The composite structure is thereafter cured.

According to an alternative example, a casting tool with an inner shape substantially corresponding to the inner shape of the shell is positioned around the uncovered, used core and the energy absorbing material is cast in the space defined by the core and the tool. Subsequently, the casting tool is removed and the shell is subsequently arranged around the energy absorbing material and bonded to the energy absorbing material by applying pressure and/or heat to the shell.

The invention is not in any way limited to the above described embodiments, instead a number of alternatives and modifications are possible without departing from the scope of the following claims.

Said energy absorbing material 26 may, as an alternative be formed by a different non-injectable lightweight material, such as balsa wood.

According to an alternative embodiment not all struts in the inner and/or outer series of circumferentially spaced struts are designed in the way described above. One or several struts in one serie may be of a different design, like being hollow for housing service components such as means for the intake and outtake of oil and/or air, for housing instruments, such as electrical and metallic cables for transfer of information concerning measured pressure and/or temperature etc. The struts may have a symmetric airfoil shape in cross section in order to effect the gas flow as little as possible.

Thus, in a component comprising a series of circumferentially spaced struts of different design, the struts of the inventive design ensures a load carrying function while other, differently designed struts may only have an aerodynamic function. At least some of these aerodynamic struts may be solid.

The core is in the embodiment shown formed by a solid beam element with a substantially rectangular cross section. As an alternative, the beam element may have a different cross section shape, like elliptic or airfoil-shaped. As a further alternative, the beam element may be hollow.

According to an alternative embodiment, there is no intermediate member arranged between the inner and outer annular members. In this embodiment only one series of circumferentially spaced radial struts are arranged between the inner and outer annular members. Opposite ends of the struts are then rigidly connected to both the inner and the outer annular members.

According to a further alternative embodiment, the component shown in FIG. 2 comprises two separate units. A first unit comprises the inner annular member, an inner part of the annular intermediate member and the inner series of circumferentially spaced struts. A second unit comprises an outer part of the annular intermediate member, the annular outer member and the outer series of circumferentially spaced struts. In this embodiment, the first unit comprises a first carcass comprising the cores of the inner struts and the second unit comprises a second carcass comprising the cores of the outer struts. The second unit is connected radially outside to the first unit forming the component.

According to a further alternative of the last mentioned embodiment, only one of the two separate units is designed with the inventive struts shown in FIG. 3 and described above. The other unit comprises struts of a conventional design.

The static gas turbine component may of course be applied also at other positions in the engine, for example in the turbine section, between the high pressure turbine and the low pressure turbine. One further alternative position for the component is at the engine intake upstreams of the fan.

The design of the composite shell may be different from the design shown in the drawings. For example, the arrangement of the fibres may differ. For example, several layers of a plurality of fibres may be arranged.

The invention claimed is:

1. A static gas turbine component comprising an inner and an outer annular support member and a plurality of circumferentially spaced radial struts arranged between the support members for transmitting structural loads wherein each of a plurality of the struts comprises
   a load carrying core rigidly fixed to both the inner and the outer support member forming a unitary carcass with the support members,
   an impact resistant shell surrounding the core, and
   an energy absorbing material arranged between the core and the shell.

2. A static gas turbine component according to claim 1, wherein the energy-absorbing material forms a continuous structure around the core.

3. A static gas turbine component according to claim 1, wherein the energy-absorbing material is in contact with both the core and the shell in a radial direction of the strut.

4. A static gas turbine component according to claim 1, wherein the energy absorbing material is formed by a foam.

5. A static gas turbine component according to claim 1, wherein the impact resistant shell comprises a polymer composite.

6. A static gas turbine component according to claim 1, wherein the impact resistant shell forms a continuous structure around the core.

7. A static gas turbine component according to claim 1, wherein the core is formed by an elongated beam extending in a longitudinal direction of the strut.

8. A static gas turbine component according to claim 1, wherein the strut has an elongated cross sectional shape and that the core has an elongated cross sectional shape extending in the lengthwise direction of the elongated cross sectional shape of the strut.

9. A static gas turbine component according to claim 1, wherein an annular intermediate member is arranged between the inner and outer support members, and the intermediate member is supported between the members by two series of radial outer and inner struts.

10. Gas turbine comprising a static gas turbine component according to claim 1.

11. Aircraft engine comprising a static gas turbine component according to claim 1.

12. Method for repairing the static gas turbine component according to claim 1, comprising, after use of the component, removing the used impact resistant shell and the used energy absorbing material of each strut are removed from each core of the unitary carcass, and applying a new impact resistant shell and a new energy absorbing material to the cores of the used unitary carcass.

13. Method according to claim 12, wherein the new shell is formed by an at least semi-stiff non-continuous circumferential structure, the core is positioned in the semi-stiff structure and fixed in the desired position in relation to the structure, and the new energy absorbing material is positioned in the space between the core and the stiff structure.

14. Method according to claim 12, wherein the new energy absorbing material is formed by an at least semi-stiff non-continuous circumferential structure, the structure comprises an opening for receival of the core, and the new energy-absorbing material is moved relative to the core so that the core is received in the opening.

15. Method according to claim 14, wherein after positioning of the new semi-stiff non-continuous energy absorbing material around the core, the shell is applied around the energy absorbing material.

16. Method according to claim 13, wherein the new energy absorbing material, in a form of foam, is injected into the stiff structure filling up the space between the core and the stiff structure.

17. Method according to claim 12, wherein a casting tool with an inner shape substantially corresponding to the inner shape of the shell is positioned around the core and that the energy absorbing material is cast in the space defined by the core and the tool.

18. Method according to claim 17, wherein the casting tool is removed and the shell thereafter is arranged around the energy absorbing material.

19. Method according to claim 18, wherein the shell is bonded to the energy absorbing material by applying at least one of pressure and heat to the shell.

* * * * *